United States Patent
Plusquellic et al.

(10) Patent No.: US 8,610,454 B2
(45) Date of Patent: Dec. 17, 2013

(54) SYSTEM AND METHODS FOR GENERATING UNCLONABLE SECURITY KEYS IN INTEGRATED CIRCUITS

(75) Inventors: James Plusquellic, Albuquerque, NM (US); Dhruva J. Acharyya, San Hose, CA (US); Ryan L. Helinski, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 13/513,941

(22) PCT Filed: Jan. 12, 2011

(86) PCT No.: PCT/US2011/020930
§ 371 (c)(1),
(2), (4) Date: Jun. 5, 2012

(87) PCT Pub. No.: WO2011/088074
PCT Pub. Date: Jul. 21, 2011

(65) Prior Publication Data
US 2012/0319724 A1    Dec. 20, 2012

Related U.S. Application Data

(60) Provisional application No. 61/335,939, filed on Jan. 12, 2010.

(51) Int. Cl.
*H03K 19/00* (2006.01)
*H05K 3/00* (2006.01)

(52) U.S. Cl.
USPC .................. 326/8; 380/46; 702/117; 714/752

(58) Field of Classification Search
USPC ........................................ 326/8, 37; 726/292
See application file for complete search history.

(56) References Cited

U.S. PATENT DOCUMENTS

| | | | |
|---|---|---|---|
| 6,161,213 A * | 12/2000 | Lofstrom | 324/750.15 |
| 7,043,389 B2 * | 5/2006 | Plusquellic | 702/117 |
| 7,564,345 B2 * | 7/2009 | Devadas et al. | 340/539.1 |
| 7,681,103 B2 * | 3/2010 | Devadas et al. | 714/752 |
| 7,840,803 B2 * | 11/2010 | Clarke et al. | 713/168 |
| 7,898,283 B1 * | 3/2011 | Koushanfar et al. | 326/8 |
| 8,446,250 B2 * | 5/2013 | Kursawe et al. | 340/5.2 |
| 2008/0279373 A1 * | 11/2008 | Erhart et al. | 380/46 |
| 2008/0279383 A1 | 11/2008 | Kato et al. | |
| 2009/0146267 A1 | 6/2009 | Peytavy et al. | |

OTHER PUBLICATIONS

Helinski et al., "A Physical Unclonable Function Defined Using Power Distribution System Equivalent Resistance Variations," DAC'09, ACM, 2009.*
Alkabani et al., "Trusted Integrated Circuits: A Nondestructive Hidden Characteristics Extraction Approach," LNCS 5284, pp. 102-117, Springer-Verlag, 2008.*

* cited by examiner

*Primary Examiner* — Shawki Ismail
*Assistant Examiner* — Nelson Correa
(74) *Attorney, Agent, or Firm* — Valauskas Corder LLC

(57) ABSTRACT

A system and methods that generates a physical unclonable function ("PUF") security key for an integrated circuit ("IC") through use of equivalent resistance variations in the power distribution system ("PDS") to mitigate the vulnerability of security keys to threats including cloning, misappropriation and unauthorized use.

21 Claims, 6 Drawing Sheets

SYSTEM AND METHODS FOR GENERATING UNCLONABLE SECURITY KEYS IN INTEGRATED CIRCUITS

This application claims the benefit of U.S. Provisional Patent Application No. 61/335,939 filed Jan. 12, 2010.

FIELD OF THE INVENTION

The present invention relates generally to protection of electrical circuitry used in hardware components, and more specifically, to a system and methods that generates a physical unclonable function ("PUF") security key for an integrated circuit ("IC").

BACKGROUND OF THE INVENTION

An integrated circuit ("IC"), also known as a chip or a microchip, is a miniaturized electronic circuit used in electronic equipment such as computer, telephone, and digital applications. An IC is typically formed of semiconductor devices, such as silicon and germanium, as well as passive components such as capacitors, resistors, and diodes. Usually, an IC is manufactured on a thin substrate of semiconductor material. In recent years, cost in manufacturing of ICs, per transistor, has decreased. However, while lower cost increases the availability of manufacturing, considerable research is associated with IC development resulting in the creation of various intellectual property. Accordingly, ICs must be protected from threats such as cloning or copying as well as protected against misappropriation and unauthorized use. Threats may allow unauthorized access to encrypted data, replication of IC design including unauthorized use of intellectual property ("IP") and hardware piracy or the illegal manufacturing of the ICs. Threats of cloning, misappropriation and unauthorized use of a security key are a problem, particularly in computer applications that use a security key in authentication protocols.

Many computer-based hardware security schemes exist to protect ICs from cloning and unauthorized use. These security schemes depend on accessibility to a security key or signature, such as a unique unclonable identifier derived from each IC. Security keys define the basis of computer-based hardware security mechanisms implemented at high levels of hardware security such as those mechanisms that perform encryption of data communication channels, or provide IP theft protection in computer-based logic devices including field-programmable gate arrays ("FPGAs").

Conventional security keys are defined using digital data stored, for example, in a flash memory or read only memory ("ROM") on the IC. From a security perspective, it is desirable that access to the security key is restricted to hardware circuits formed on the IC. Unfortunately, security keys stored using these conventional technologies are subject to invasive physical attacks which can allow an adversary to learn the secret key. If the secret key is learned by an adversary, then clones ICs can be created and security protocols can be compromised.

Various techniques have been proposed to protect ICs using physical unclonable function ("PUF") implementations. Challenge-based IC authentication is one example. With challenge-based IC authentication, a secret key is embedded in the IC that enables the IC to generate a unique response to a challenge, which is valid only for that challenge. Thus, the key remains secret and the mechanism performing authentication is resistant to spoofing. Remote activation schemes are another example. Remote activation schemes enable IC designers to lock each IC at start-up and then enable it remotely, providing intellectual property protection and hardware metering. States are added to the finite state machine ("FSM") of a design and control signals are added which are a function of the secret key. Therefore, the hardware locks up until receipt of a specific activation code. Other examples of PUF implementations include mismatched delay-lines, static random access memory ("SRAM") power-on patterns, metal-oxide semiconductor ("MOS") device mismatches and input dependent leakage patterns. However, each of these techniques has vulnerabilities related to misappropriation, cloning or unauthorized use of a security key for an IC.

There is a demand to improve the security of ICs, particularly mitigating the vulnerability of security keys to threats including cloning, misappropriation and unauthorized use. The present invention satisfies this demand.

SUMMARY OF THE INVENTION

According to the present invention, the vulnerability of an embedded security key stored on an IC is mitigated by deriving the security key from the physical characteristics of the IC. A physical unclonable function ("PUF") circuit generates a silicon-variation-based security key. The PUF circuit includes a specialized electrical hardware circuit that is sensitive to process variations. The PUF further includes a mechanism to retrieve a unique set of responses from a variety of different challenges. A security key derived from a PUF circuit has properties such as volatility and non-replicability, which make it extremely difficult to clone, misappropriate or compromise the security key.

In one embodiment, a PUF may be implemented based on the variability in passive and active components or leakage current associated with the IC. In another embodiment, a PUF may be implemented based on variability in only passive components, for example, metal wires. A PUF circuit security key that is based on the variations in passive components of the IC is less susceptible (and therefore more robust) to environmental variations such as temperature and electrical circuit noise. While process variations in active components can be leveraged to create a diverse set of responses across ICs, the performance variations in active components are also subject to environmental variations. Therefore, these embodiments also necessitate calibration for environmental variations so that the response of the PUF circuit does not depend on the environmental conditions. However, calibration of the environmental conditions may complicate the design of the PUF circuit and make them less attractive for security applications.

Since the power grid is an existing and distributed resource in every design of an IC, the space required by a power grid-derived PUF is limited to the area available for the added challenge/response circuitry. Moreover, the distributed nature of the power grid makes it more prone to larger random and systematic process variation effects. Process variation effects introduce resistance variations whose magnitudes vary across different regions of the power grid thereby improving the security of an IC because it makes it less probable that the PUFs of two different ICs will produce the same response or security key.

Although the present invention is discussed herein with respect to power grids, it is contemplated that the present invention is applicable to deriving PUF responses from a ground grid. One embodiment of the invention includes a PUF circuit having a security key generated from the resistance variations in the power grids of ICs fabricated in a 65 nm technology. The PUF response may be defined in two ways. First, the response may be a set of voltage drops measured at a set of distinct locations on the power grid of the IC. Second, the response may be a corresponding set of equivalent resistances computed at the same set of distinct locations on the power grid of the IC. A PUF circuit enables a variety of challenges to be introduced to a power grid system, and measures the voltage drops or responses to those challenges.

PUF circuit security keys may be implemented in many applications including IC identification, enumeration in wireless sensor nodes, IC process quality control, hardware metering, challenge-based IC authentication, IP protection in FPGAs, cryptography, and remote service and feature activation.

In one embodiment, the invention is a security key generating system for an integrated circuit. The security key generating system includes a power grid with a plurality of power points, a voltage sense wire, and a plurality of intersecting striped layers. A voltage-measuring apparatus is connected to the voltage sense wire and at least one power supply is electrically connected to the plurality of power points. A ground grid is electrically connected to the power grid and at least one stimulus-measure circuit is disposed between the power supply and the ground grid. It is contemplated that the stimulus-measure circuit may include a shorting inverter, a voltage sense transistor, or a flip-flop. In certain embodiments, flip-flops may include an output connected to a shorting inverter. The shorting inverter may further comprise a first field-effect transistor having a source connected to a power supply and a drain connected to a source of a second field-effect transistor. The stimulus-measure circuit may further include a third flip-flop and a voltage sense field-effect transistor. Output of one flip-flop may be inputted to another third flip-flop, and the output of a flip-flop may be provided to a gate of the voltage sense field-effect transistor. A source of the voltage sense field-effect transistor is connected to a power supply, and a drain of the voltage sense field-effect transistor is connected to the voltage sense wire. It is also contemplated that the shorting inverter may comprise two connected field-effect transistors, with a first flip-flop providing an output to a gate of one of the two connected field-effect transistors, and a second flip-flop providing an output to a gate of the other of the two connected field-effect transistors.

The stimulus-measure circuit may include a first flip-flop, a second flip-flop connected to the first flip-flop, a third flip-flop connected to the second flip-flop, a shorting inverter connected to the first flip-flop, a first voltage sense field-effect transistor connected to the second flip-flop, and a second voltage sense field-effect transistor connected to the third flip-flop. A second voltage sense wire may also be connected to the stimulus-measure circuit with an operational amplifier having one input connected to the second voltage sense wire and another input connected to the other voltage sense wire and a key generator control connected to an output of the operational amplifier.

In another embodiment, the stimulus-measure circuit may include a plurality of flip-flops connected in series with a decoder connected to at least one of the plurality of flip-flops. The stimulus-measure circuit may also include one or more voltage sense field-effect transistors and a shorting inverter connected to the plurality of flip-flops. It is contemplated that the decoder is a 4 to 16 inverting decoder and one flip-flop is connected to a shorting inverter and at least two flip-flops are connected to the decoder. Outputs of the decoder may be connected to gates of one or more voltage sense field-effect transistors and the shorting inverter comprises a pair of connected field-effect transistors.

In another embodiment of the invention, a method of creating a physical unclonable function circuit security key includes the steps of providing a substrate and formulating a power grid on the substrate. The PUF is implemented such that the infrastructure that defines the security key does not consume a large area of the IC, since physical space on the semiconductor substrate is typically limited. The power grid includes one or more power ports. The power grid is connected to a power supply and one or more stimulus-measure circuits are inserted. Each of the one or more stimulus-measure circuits includes a shorting inverter, at least one voltage sense transistor, and at least one flip-flop. The security key is derived for the physical unclonable function circuit based on a measured stimulus and response between nodes of the power grid and the one or more stimulus-measure circuits. It is contemplated the security key may be a voltage drop security key or an equivalent resistance security key.

BRIEF DESCRIPTION OF THE DRAWINGS

The preferred embodiments of the invention will be described in conjunction with the appended drawing provided to illustrate and not to the limit the invention, where like designations denote like elements, and in which.

DETAILED DESCRIPTION OF PREFERRED EMBODIMENTS

As described herein, a power grid system having a physical unclonable function circuit for generation of a security key is provided. The system is based on the measured equivalent resistance variations in the power distribution system ("PDS") of an IC. Although the present invention is discussed herein with respect to a power grid system, it is contemplated that the present invention is applicable to deriving PUF responses from a ground grid system.

Figure 1:
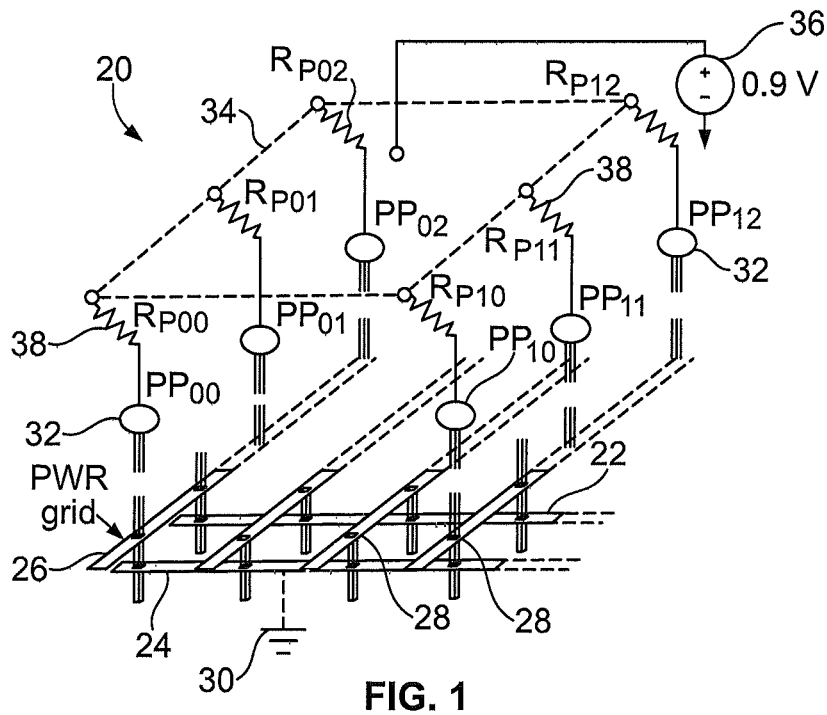
FIG. 1 is a schematic diagram of a power grid architecture according to an embodiment of the present invention.

A schematic representation of a power grid system is shown generally as 20 in FIG. 1. The power grid system 20 includes a power grid 22 which has adjacent metal striped layers 24 and 26 that intersect each other at right angles in a mesh configuration. The adjacent metal layers 24, 26 include vias 28 placed at the intersections of the layers. A ground grid 30 partially shown in dashed lines can be interleaved with the adjacent metal layers 24, 26 and routed in a similar manner. It is contemplated that the structure of the ground grid 30 is similar to the structure of the power grid 22. For example, both grids 22 and 30 can be routed across 10 metal layers available in the 65 nm IC forming process. The width of the wires and the granularity of the mesh of the power grid 22 vary across the metal layers 24 and 26. For example, the widths of the lower metal wires in the metal layers 24 and 26 can be smaller and the granularity can be finer than the widths and granularity of the metal wires in the upper layers of the metal layers 24 and 26.

The power grid 22 may be connected to a set of six controlled collapse chip connections (C4s) or power ports (PPs) 32 in a top metal layer 34. The PPs 32 are labeled in a matrix notation as $PP_{00}$ through $PP_{12}$. The PPs 32 allow the power grid 22 to be connected to a power supply 36, for example through a membrane style probe card during wafer probe or through the package wiring. The finite resistances 38 of power port connections are represented as series resistances $Rp_{xy}$ in FIG. 1.

Figure 2:
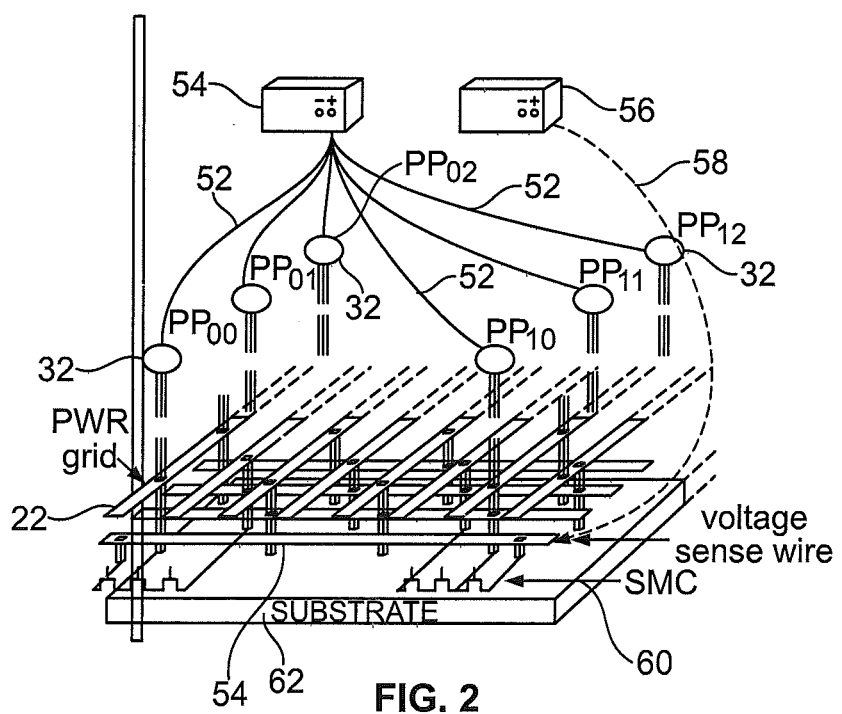
FIG. 2 is a schematic diagram of an instrumentation setup including a global current source meter and a volt meter connected to the power grid architecture of FIG. 1 according to the present invention.

A test jig indicated generally as 50 is shown in FIG. 2. The PPs 32 are connected via wires 52 to a power source, such as a global current source meter ("GCSM") 54. The GCSM 54 provides a voltage, for example 0.9 V, to the power grid 22 and preferably can measure electrical current at a resolution of approximately 300 nA. In addition to measuring the global electric currents to each of the PPs 32, measurements of on-chip voltage also occur. The on-chip voltage, in certain embodiments, can be measured using an off-chip pin that is connected internally to a globally routed voltage sense wire 54. A voltage measuring apparatus, such as voltmeter 56 can be connected via dashed line 58 to the off-chip pin, as shown in FIG. 2. A stimulus-measure circuit (SMC) 60 is inserted under each of the PPs 32. Each SMC 60 is formed on a semiconductor substrate 62, which can be formed of, for example, silicon or silicon-germanium. In alternative embodiments, it is envisioned that the SMC 60 may be connected to the ground grid 30 in a similar manner as the SMC is connected to the power grid 22 in order to sense electrical current variations in the ground grid.

The SMC 60 is shown in more detail in FIGS. 3(a) and 3(b). FIG. 3(a) shows a top view of FIG. 2 with the metal layers 24 and 26 removed. In this embodiment, the PPs 32 are organized in a rectangular arrangement. A lateral distance 62 between $PP_{02}$ and $PP_{12}$ is 558 μm, and a width distance 64 between $PP_{02}$ and $PP_{00}$ is 380 μm. An SMC 60 is located under each of the PPs 32.

Turning now to FIG. 3(b), a more detailed view of one preferred embodiment of a SMC 60 connected to the power grid system 20 is shown. The SMC 60 includes a shorting inverter having a lower transistor 70 that has a drain connected to the ground grid 30, a voltage sense transistor 72 that has a drain connected to the voltage sense wire 54, and a set of three flip-flops $FF_1$, $FF_2$, and $FF_3$. In the present embodiment, the transistors are field-effect transistors and the flip-flops are scan flip-flops. The volt meter 56 is also connected to the voltage sense wire 54 and measures the voltage at this node of the SMC circuit 60. The flip-flop $FF_1$ receives a scan chain input 74. The flip-flop $FF_1$ provides an output 76 to the flip-flop $FF_2$ and an inverter 78. Output from the inverter 78 is provided to the gate of the lower transistor 70 of the shorting inverter. The flip-flop $FF_2$ has an output 80 provided to flip-flop $FF_3$ and also a gate of an upper transistor 82 of the shorting inverter.

The drain of the upper transistor 82 is connected to the source of the lower transistor 70. The source of the voltage sense transistor 72 connects via one of $M_1$ to $M_{10}$ metal layers 84 to the power supply 36. Output from the flip-flop $FF_3$ is provided to the gate of the voltage sense transistor 72 and other flip-flops of SMCs 60. The shorting inverter lower transistor 70 provides a controlled stimulus, i.e., an electrical short between the power supply 36 and ground grid 30, when the states of flip-flop $FF_1$ and flip-flop $FF_2$ are set to 0 (low). The voltage on the power grid is measured using the voltage sense transistor 72, enabled with a 0 (low) in flip-flop $FF_3$.

A security key can be derived using two strategies, one that is based on voltage drops and another that is based on equivalent resistances at different nodes of the system power grid. In either strategy, the security key associated with the IC is composed of six quantities, each corresponding to one of the six SMCs 60. The security key for a given IC under the voltage drop strategy can be constructed by enabling (high logic state) the shorting inverter transistors 70 in the SMCs 60, one at a time, and then measuring the voltage at the source of the shorting inverter transistor using the voltage sense transistor. A voltage drop is computed by subtracting the measured voltage from the power supply 36, which is shown in the exemplary embodiment as 0.9V. The process of measuring a voltage at a source of an exemplary shorting inverter field-effect transistor and computing a voltage drop is repeated for each of the other five SMCs 60. The resulting set of six computed voltages defines the security key.

The values of the voltages defining the security key are affected by the magnitude of the electrical current passing through each shorting inverter. Accordingly, the variations in the magnitude of the electrical current passing through each shorting inverter transistor add to the randomness of the security key. In this embodiment the PUF circuit may be sensitive to environmental conditions and require some fine tuning or controlled environmental conditions to generate the same security key.

In another embodiment using an equivalent resistance ("ER") strategy, the sensitivity of the PUF circuit to environmental conditions may be reduced. The sensitivity may be reduced by dividing the computed voltage drops by the associated global measured electrical currents passing through the shorting inverter.

In other examples, it is possible that hundreds of SMCs 60 can be inserted into commercial power grids, which would greatly expand the complexity of the security key over that shown in the six PPs example above. Inserting a large number of SMCs in a power grid architecture is feasible because the amount of on-chip space of the SMC is small. For example, using a total of 100 SMCs, each SMC having an area of 50 μm² yields a space requirement of 5000 μm². However, this is only 0.02% of the 25,000,000 μm² area available in a 5 mm×5 mm IC chip.

Figure 3:
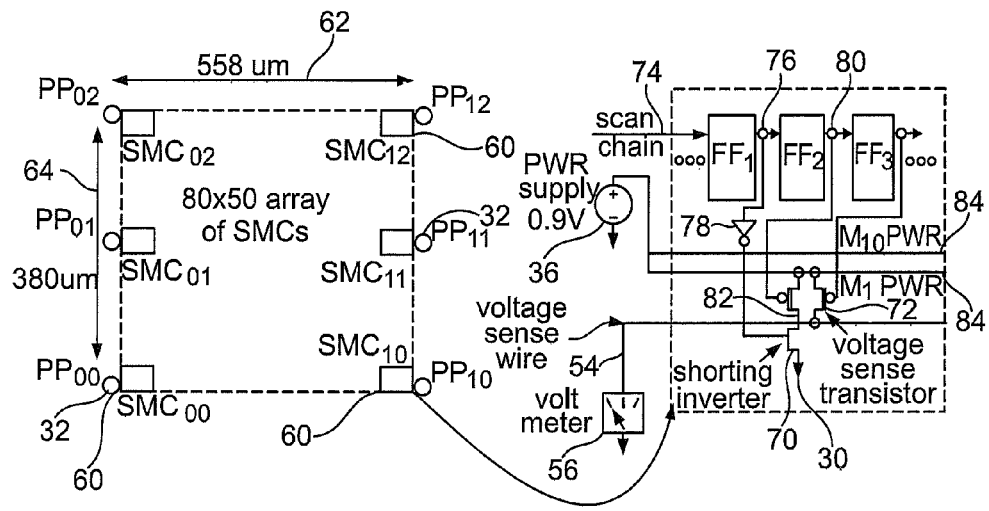
FIG. 3 is a schematic diagram of a stimulus/measure circuit ("SMC") according to the present invention.
Figure 4A:
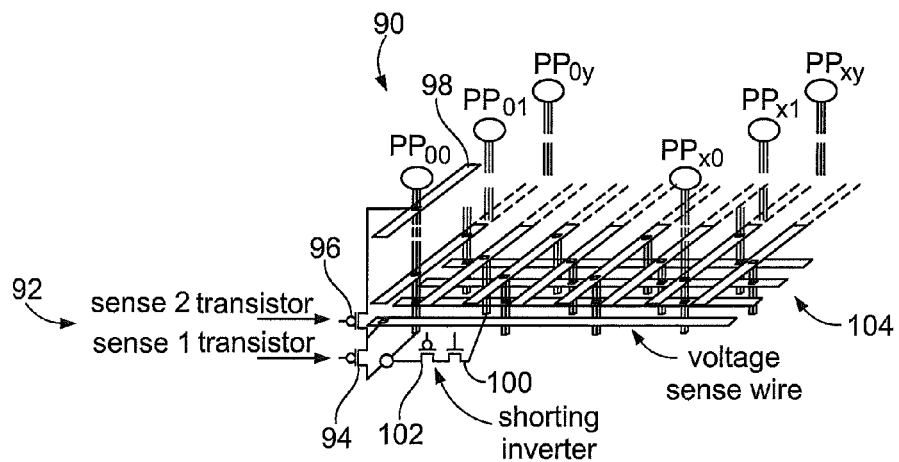
FIG. 4 is a schematic diagram of another embodiment of a SMC according to the present invention.

In another embodiment of the invention shown generally as 90 in FIG. 4(a), a modification of the SMC 60 is provided. The SMC 60 shown in FIG. 3(b) is modified to form a SMC 92 which incorporates more than one voltage sense transistor. FIG. 4(a) shows a first voltage sense transistor 94 and an added second voltage sense transistor 96. The second voltage sense transistor 96 enables a voltage to be measured in a metal layer 98 located underneath the power port $PP_{00}$. A shorting inverter having a lower transistor 100 and an upper transistor 102 is connected to the $PP_{00}$ power port. The second voltage sense transistor 96 may be used to measure the voltage drops between metal layers $M_1$ and $M_{10}$ (see FIG. 4(b)) at different places on a power grid 104. The present embodiment of the SMC increases the number of stimulus/response pairs capable of being measured and computed. The use of a larger number of stimulus/response pairs causes the security key to be more complex since more voltage drops are now computed between any pairing of the first voltage sense transistor 94 and second voltage sense transistor 96 across the array of SMCs 92.

Figure 4B:
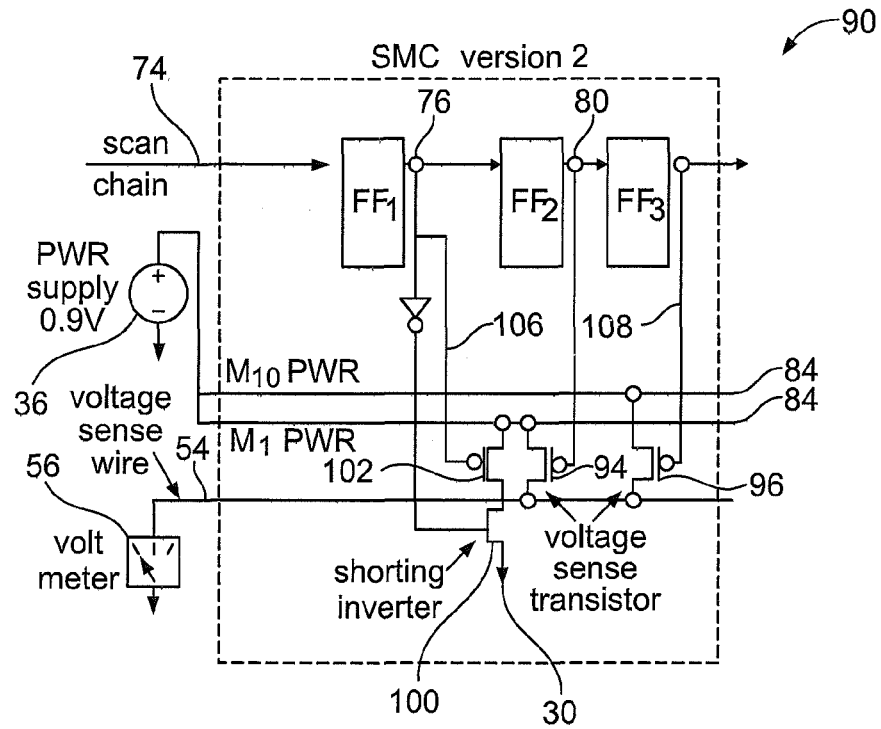

FIG. 4(b) further illustrates the embodiment 90 having the modified SMC 92, and has like components of FIG. 3(b) identified with similar references numbers. The SMC 90 includes a shorting inverter having a lower transistor 100 that has a drain connected to the ground grid 30, a first voltage sense transistor 94 that has a drain connected to the voltage sense wire 54, and a set of three scan flip-flops $FF_1$, $FF_2$, and $FF_3$. The volt meter 56 is connected to the voltage sense wire 54 and measures the voltage at this node of the SMC circuit 90. The flip-flop $FF_1$ receives a scan chain input 74. The flip-flop $FF_1$ further provides an output 76 to the flip-flop $FF_2$ and an inverter 78. Output from the inverter 78 is provided to the gate of the lower transistor 100 of the shorting inverter. Output from the flip-flop $FF_1$ is also provided via line 106 to the gate of the upper transistor 102 of the shorting inverter. The flip-flop $FF_2$ has an output 80 provided to flip-flop $FF_3$ and also a gate of the first voltage sense transistor 94.

The drain of the upper transistor 102 is connected to the source of the lower transistor 100. The source of the first voltage sense transistor 94 connects via metal layers $M_1$ or $M_{10}$ 84 to the power supply 36. Output from the flip-flop $FF_3$ is provided to the gate of the second voltage sense transistor 96 via line 108 and other flip-flops of SMCs 90.

FIG. 4(b) has an additional flip-flop FF3 used to control the second sense transistor 96. In this embodiment, it is possible to replace the shorting inverter with a single positive channel field-effect transistor ("PFET"). However, the stacked devices of the shorting inverter are more robust to defects and provide a fault tolerant strategy to prevent yield loss that might result if a defect caused the stimulus transistor to remain in an ON state.

Figure 5:
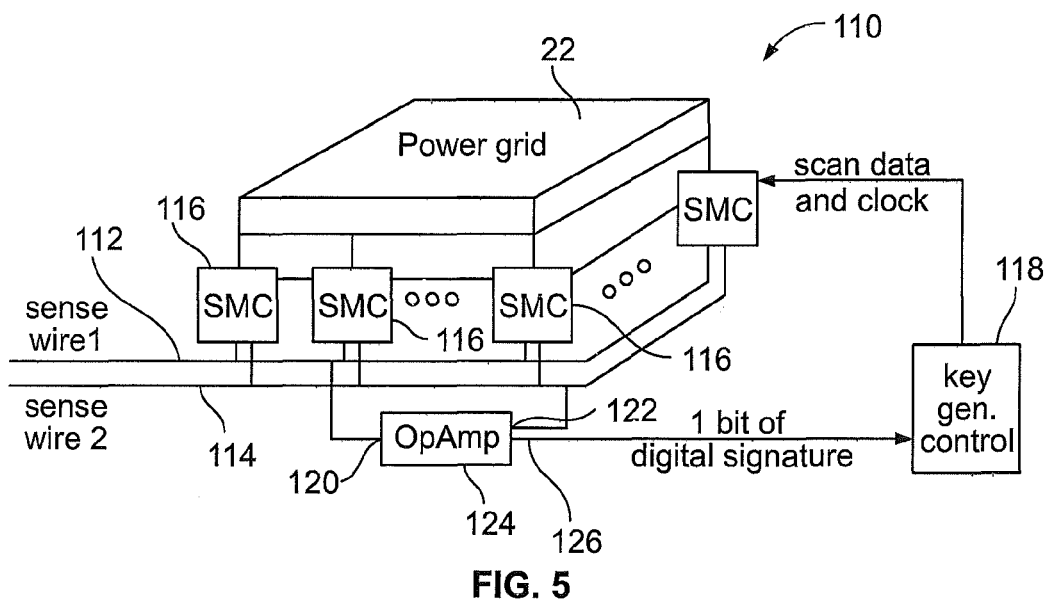
FIG. 5 is a schematic diagram of on-chip instrumentation for generating a security key according to the present invention.

In another embodiment 110 of the present invention shown in FIG. 5, an increase in the number of stimulus/response pairs is provided, which allows the stimulus to be applied from more than one SMC. In this embodiment 110, multiple shorting inverters are enabled simultaneously at different locations and the voltage drops are measured using different combinations of transistor pairs each connected to one of a first voltage sense wire 112 or a second voltage sense wire 114. The present application refers to these scenarios as "multiple-on" scenarios and the former embodiments 60 and 90 as "single-on" scenarios. Since the power grid is a linear system, superposition applies. Therefore, to make the IC more resilient to attack, where an attacker systematically deduces the voltage drops that would occur under a multiple-on scenario by measuring the voltage drops under all single-on scenarios, the present embodiment can include an obfuscation of the scan chain control bits. Under obfuscation, the number and position of the enabled shorting inverters are deterministically (or randomly) scrambled for a given scan chain control sequence, making it difficult or impossible to systematically apply single-on tests at known locations on the chip. For chip-specific random scrambling, a subset of the SMCs 116 can be used during initialization to define the state of a selector that controls the scan chain scrambling configuration.

The present embodiment requires the use of external instrumentation to measure the voltages and global electrical currents required to compute the IC's security key. Although this embodiment is applicable to chip authentication applications, e.g., where the objective is to periodically check the authenticity of a chip or set of chips to circumvent attempts to replace the chips with counterfeits, it is not amenable to cryptology applications that use the security key in hardware implemented encryption/decryption algorithms. In order to serve this latter application, the security key generation process preferably uses on-chip instrumentation.

As shown in FIG. 5, a key generator control unit 118 drives the scan-in, scan-out and scan-clock signals of the SMCs with a specific pattern. The specific pattern enables one or more of the shorting inverters in the array of SMCs. This embodiment uses the original SMC 60 (FIG. 3) modified to include a second voltage sense transistor connected between metal layer $M_1$ and the second voltage sense wire 114. The scan pattern also enables two voltage sense transistors, one for each of the two voltage sense wires 112 and 114. The two voltage sense wires 112 and 114 are routed to respective inputs 120 and 122 of a differential operational amplifier or Op Amp 124. The Op Amp 124 outputs a logic low '0' or a high '1' at line 126 depending on whether the voltage on voltage sense wire 112 is larger or smaller than the voltage on voltage sense wire 114, respectively. The 1-bit output on line 126 is sent to the key generation control unit 118 and the process is repeated until a sufficient number of bits are generated to realize the security key. This implementation of the present invention may be more sensitive to environmental variations because it makes use of voltages instead of equivalent resistances, as described earlier. Therefore, the response for a given chip under a given sequence of scan patterns may differ over time unless temperature and power supply noise are monitored and controlled. In other examples, more noise tolerant architectures are possible but such architectures will increase the required on-chip area associated with the generation of the security key.

The following describes the results from experiments to evaluate certain embodiments of the present invention specifically with respect to the diversity in the voltage drops and equivalent resistances in a set of thirty-six chips. Also described are the results from an additional set of experiments which evaluate the stability of the PUF circuit.

The PUF circuit stability experiments were performed on one of the chips in the set. To evaluate stability, the process was repeated for the security key generation/measurement process seventy-two times. No temperature control or specialized low noise test apparatus was used. The variation across the set of security keys from these experiments is due to environmental noise and temperature variations. The stability experiments assist in determining the probability of security key aliasing, i.e., the probability that two chips from the population generate the same security key. Data from the stability experiments was used as control data.

Figure 6:
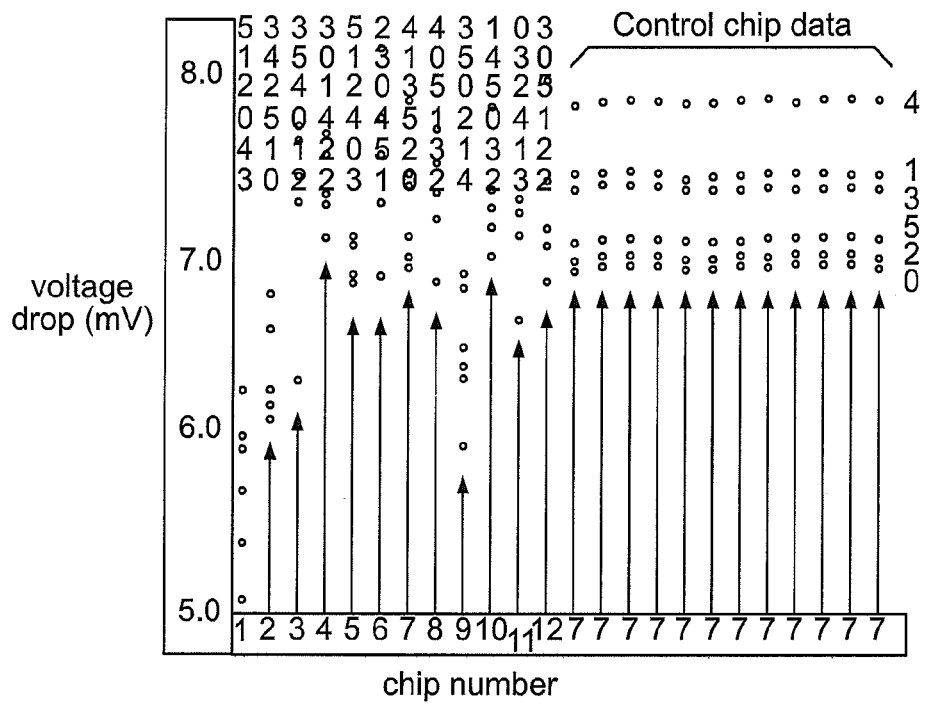
FIG. 6 is a graph illustrating voltage drop signatures according to the present invention.
Figure 7:
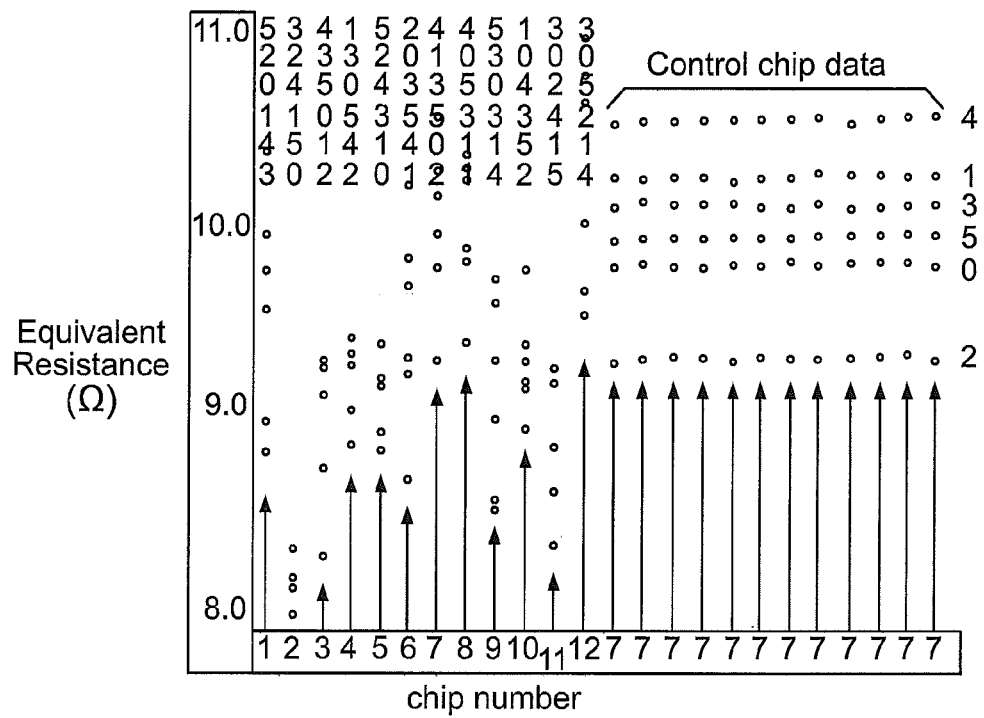
FIG. 7 is a graph illustrating resistance signatures according to the present invention.

The experimental results for twelve of the chips from the set of thirty-six are shown in FIGS. 6 and 7, using the voltage drops and equivalent resistances, respectively. The left half of the figures lists the chip number along the abscissa or x-axis. The right half of the figures along the abscissa axis lists twelve PUF circuit stability data for one chip. The six data points defining the chip security key are displayed vertically above the chip identifier. The ordinate or y-axis in the figures indicates the voltage drop and equivalent resistance in FIGS. 6 and 7, respectively.

The diversity among the security keys in the twelve chips shown on the left side of FIGS. 6 and 7 is evident in both plots. In addition to the different patterns of dispersion in the security keys, the ordering of the data points from top to bottom is also distinct across all chips. The ordering is in reference to the SMCs that each data point corresponds to as shown in the figures. For example, $SMC_{00}$ in FIG. 3(a) is assigned 0, $SMC_{01}$ is assigned 1, and $SMC_{12}$ is assigned 5. In FIG. 6, the ordering for chip 1 is 5, 1, 2, 0, 4, and 3, while the ordering for chip twelve is 3, 0, 5, 1, 2, and 4. Therefore, the diversity among the security keys due to dispersion is actually larger because of the differences in the orderings. It is also clear from the experiments that in some embodiments environmental variations may have an impact on a security key and therefore, may need to be taken into account.

In some examples, there may be differences in the dispersion and ordering of the data points for the same chip across the voltage drop and equivalent resistance analyses. This is expected because the equivalent resistance eliminates an element of the diversity introduced by variations in the magnitude of the shorting electric currents. In order to quantitate the dispersion among the chip security keys, the Euclidean distance between the data points is computed and their variance is analyzed.

For a security key having six data points, the six data points in each security key can be interpreted as a single point in a six-dimensional space.

$$\text{Dist}=\sqrt{[(x_1-y_1)+(x_2-y_2)+\ldots+(x_6-y_6)]} \qquad \text{Eq. 1.}$$

The Euclidean distance between two security keys for chips x and y is given by Equation 1. The Euclidean distance is computed between all possible pairing of chips, i.e., (36*35)/2=630 combinations. The same procedure is carried out using the control data in which (72*71)/2=2556 combinations are analyzed.

Figure 8:
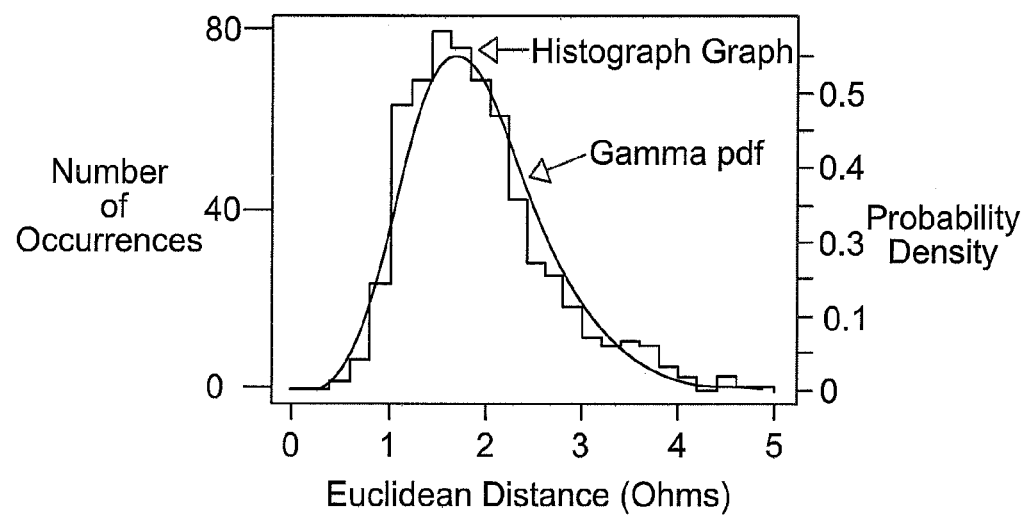
FIG. 8 is a graph illustrating a gamma function fit of a chip equivalent resistance histogram according to the present invention.
Figure 9:
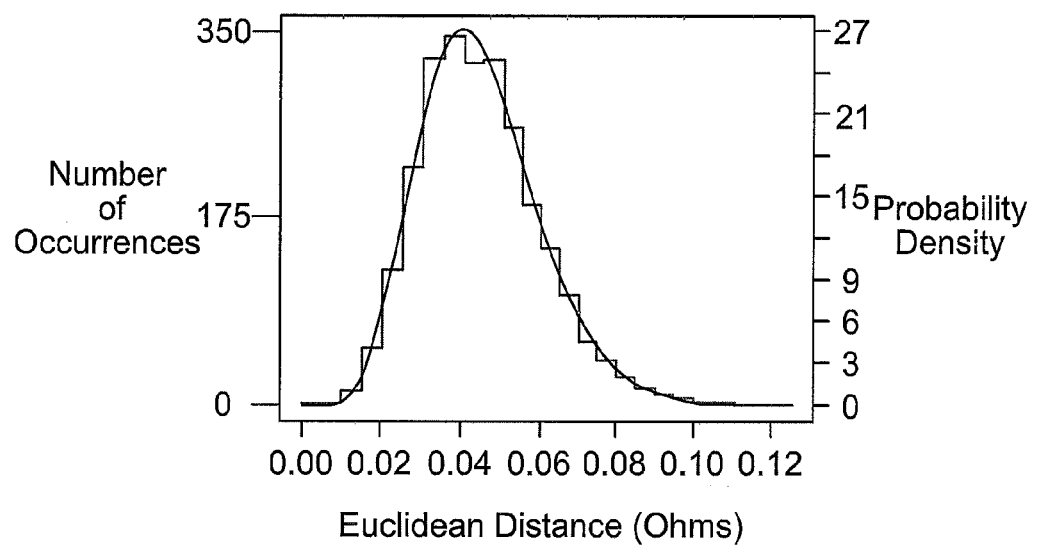
FIG. 9 is a graph illustrating a gamma function fit of a noise equivalent resistance histogram according to the present invention.

In order to compute the probability of two chips having the same security key given the uncertainty associated with the voltage or equivalent resistance measurements, a histogram that tabulates the number of Euclidean distances partitioned into a set of bins for the chip and noise data sets separately is computed. The bins in each histogram are equal in width, with each equal to ¹⁄₂₅th of the total span that defines the range of Euclidean distances among the 630 and 2556 combinations of chip and noise data pairings, respectively. The histograms were then fit to gamma probability density functions ("PDF"). The histograms and the gamma PDFs are shown superimposed in FIG. 8 (chip) and FIG. 9 (noise) for the equivalent resistance analysis. In both cases, the gamma functions are a good fit to the histograms. The range of values found among the 630 chip pairings is between 0.45 and 5.0, as indicated by the abscissa axis, while the range for the noise analysis in the abscissa axis is between 0.01 and 0.12. Therefore, the largest value in the noise data is approximately four times smaller than the smallest value in the chip data.

The probability of aliasing was computed by first determining the Euclidean distance in the noise data that bounds 99.7% (3 sigma) of the area under the PDF. This particular Euclidean distance is the upper bound for the worst case noise and is equal to 0.099 for the data shown in FIG. 9. Then, a computation is taken of the cumulative distribution function ("CDF") of the chip data and is used as a worst case noise value to determine the probability of aliasing by looking up the ordinate or y-axis number of occurrences value on the chip CDF associated with this x-value. This gives the probability that the Euclidean distance between any pairing of two chips is less than or equal to the worst case Euclidean distance among the control data.

The results for the equivalent resistance and voltage analyses are given in Table 1. Using equivalent resistances, the probability of aliasing is $6.9\,e^{-8}$ or approximately 1 chance in 15 million. For the voltage analysis, the probability increases to approximately 1 chance in 28 billion. Given that the number of SMCs used to define the security key in these experiments is only six, it can be expected, based on these results that the probability would vastly improve in a design that included a larger number of SMCs.

TABLE 1

| Probability of aliasing | | |
|---|---|---|
| | Analysis Type | |
| | Voltage | Equivalent Resistance |
| Prob Eucl. Dist. Of chips < 99.7% of all noise Eucl. dist. | 3.5e−11 | 6.9e−8 |

The experiments and results described above on the power grid PUF circuit demonstrate feasibility of the embodiments described herein. Given the high degree of randomness provided by the single-on scenarios, in combination with the limited increase in randomness provided by multi-on scenarios, expanding single-on scenarios generates a security key that is difficult for unauthorized users to clone or determine. This approach to generating a security key further indicates that excellent single bit probabilities (the probability that a response bit is '0' is nearly 50%) under an actual use scenario using data from the single-on PUF circuit is present. The actual use scenario involves comparing voltage drops or equivalent resistances between pairing of transistors on the same IC.

Figure 10:
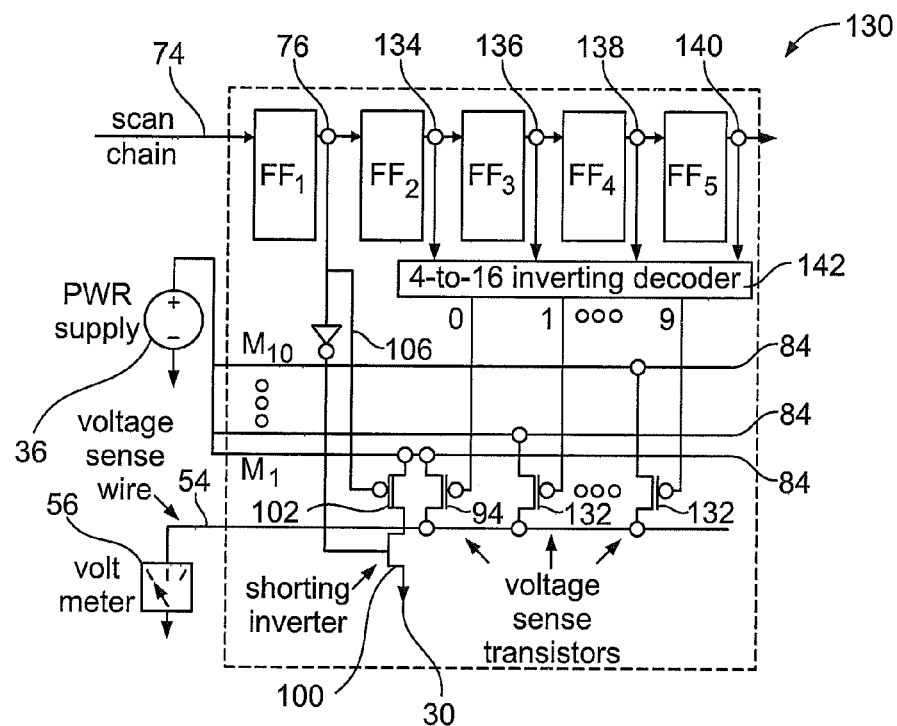
FIG. 10 is a schematic diagram of another embodiment of a SMC with multiple sense transistors according to the present invention.

Another embodiment 130 of the present invention may provide an increase in the number of single-on scenarios, as shown in FIG. 10. The embodiment 130 can include additional voltage sense transistors 132 that connect to each of the metal layers, e.g., $M_1$ through $M_{10}$, in a vertical fashion. This allows 10 voltage drops and equivalent resistances based on the number of metal layers to be measured from each SMC. Flip-flops $FF_2$ through $FF_5$ drive the inputs from a respective flip-flop and provide outputs 134-140, respectively, to a 4-to-16 inverting decoder 142 which functions to produce a single low logic '0' on one of the voltage sense transistors when driven with a specific bit pattern. The inverting decoder 142 can be designed such that an input bit pattern of all high logic '1's disables all voltage sense transistors.

Decoding logic can be added to minimize the additional hardware required for the SMC design in this embodiment. Even if these modifications triple the size of the PUF circuit to 150 mm, this embodiment still only represents an area of 0.06% on a 5 mm×5 mm chip that includes 100 copies of the SMC. Also, SMC leakage current in this embodiment is negligible because the stacked transistors in the shorting inverter are both off, and there is no voltage drop across the voltage sense transistors, when the SMCs are not being used. Furthermore, each SMC may be able to provide up to 10 times the number of response bits compared to the embodiment 60 of FIG. 3(b), and therefore fewer copies will be needed to achieve a specific size for the response bit space.

The SMC embodiment of FIG. 10 permits any pairing of voltage drops or equivalent resistances from two different PUF circuits to be compared. However, the actual use scenario must be constrained such that only same layer voltage drops or equivalent resistances are compared. This restriction is necessary because voltage drops or equivalent resistances increase monotonically across the vertical dimension of the power grid. This restriction avoids adding bias to the single-bit probabilities that would otherwise occur if any arbitrary pairing was allowed.

The PUF circuit as described in FIG. 10 requires the use of external instrumentation to measure the voltages and global electrical currents needed to compute the PUF circuit responses. Although this embodiment serves the chip authentication application well, e.g., where the objective is to periodically check the authenticity of chips to circumvent attempts to replace the chips with counterfeits, it is not amenable to cryptography applications that use the PUF responses as the security key in encryption/decryption algorithms. In order to serve this latter application, the PUF responses can be computed using on-chip instrumentation.

Figure 11:
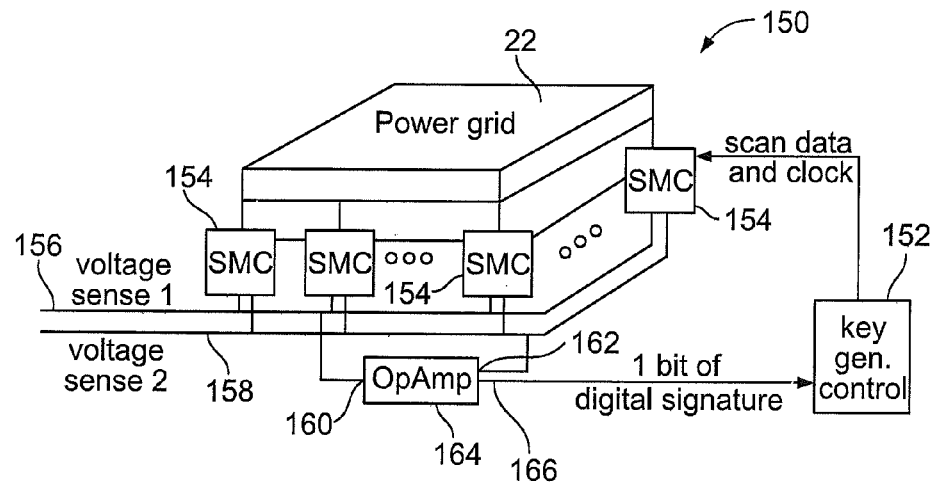
FIG. 11 is a schematic diagram of another embodiment of on-chip instrumentation for generating a security key according to the present invention.

An exemplary embodiment 150 using on-chip instrumentation is shown in FIG. 11. A key generator control unit 152 drives the scan-in, scan-out and scan-clock signals of the SMCs 154 with a specific pattern to enable one or more of the shorting inverters in the array of SMCs. The scan pattern also enables two voltage sense transistors, one for each of the first voltage sense wire 156 and second voltage sense wire 158, respectively. The two voltage sense wires 156 and 158 are routed to the inputs 160 and 162, respectively, of a differential Op Amp 164. The Op Amp 164 outputs a logic value '0' or a '1' along line 166 depending on whether the voltage on the first voltage sense wire 156 is larger or smaller than the voltage on the second voltage sense wire 158. The 1-bit response is sent via line 166 to the key generation control unit 152 and the process is repeated until a sufficient number of bits are generated to realize the security key. This embodiment may be sensitive to environmental variations because it makes use of voltages instead of equivalent resistances. Other more temperature and noise tolerant embodiments are possible as discussed above, but such designs may increase the on-chip area needed to generate the security key. While a power grid 22 is illustrated as being connected to the SMC's 154, it is contemplated that in an alternative embodiment a ground grid may be connected to the SMC's.

While the present invention and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the invention, which is to be limited not by the exemplary embodiments but by the appended claims.

What is claimed is:

1. A security key generating system for an integrated circuit, comprising:
   a power grid having a plurality of power points, a voltage sense wire, and a plurality of intersecting striped layers;
   a voltage measuring apparatus connected to said voltage sense wire;
   at least one power supply electrically connected to said plurality of power points;
   a ground grid electrically connected to said power grid; and
   at least one stimulus-measure circuit disposed between said at least one power supply and said ground grid to derive a physical unclonable function from at least one of said power grid and said ground grid, wherein each of said at least one stimulus-measure circuit includes at least one voltage sense transistor.

2. The system of claim 1, wherein each of said at least one stimulus-measure circuit includes a shorting inverter.

3. The system of claim 1, wherein each of said at least one stimulus-measure circuit includes at least one flip-flop.

4. The system of claim 1, wherein each of said at least one stimulus-measure circuit comprises a first flip-flop and a second flip-flop each having an output connected to a shorting inverter.

5. The system of claim 4, wherein said shorting inverter further comprises a first field-effect transistor having a source connected to said at least one power supply and a drain connected to a source of a second field-effect transistor.

6. The system of claim 5, wherein each of said at least one stimulus-measure circuit further includes a third flip-flop and a voltage sense field-effect transistor.

7. The system of claim 6, wherein the output of said second flip-flop is inputted to said third flip-flop, and an output of said third flip-flop is provided to a gate of said voltage sense field-effect transistor.

8. The system of claim 7, wherein a source of said voltage sense field-effect transistor is connected to said at least one power supply, and a drain of said voltage sense field-effect transistor is connected to said voltage sense wire.

9. The system of claim 4, wherein said shorting inverter comprises two connected field-effect transistors, said first flip-flop provides an output to a gate of one of said two connected field-effect transistors, and said second flip-flop provides an output to a gate of the other of said two connected field-effect transistors.

10. The system of claim 1, wherein each of said at least one stimulus-measure circuit includes:
    a first flip-flop;
    a second flip-flop connected to said first flip-flop;
    a third flip-flop connected to said second flip-flop;
    a shorting inverter connected to said first flip-flop;
    a first voltage sense field-effect transistor connected to said second flip-flop; and
    a second voltage sense field-effect transistor connected to said third flip-flop.

11. The system of claim 10, further comprising:
    a second voltage sense wire connected to said at least one stimulus-measure circuit;
    an operational amplifier having one input connected to said second voltage sense wire and another input connected to said other voltage sense wire; and
    a key generator control connected to an output of said operational amplifier.

12. The system of claim 1, wherein each of said at least one stimulus-measure circuit includes:
    a plurality of flip-flops connected in series;
    a decoder connected to at least one of said plurality of flip-flops;
    one or more voltage sense field-effect transistors; and
    a shorting inverter connected to said plurality of flip-flops.

13. The system of claim 12, wherein said decoder is a 4 to 16 inverting decoder.

14. The system of claim 12, wherein said plurality of flip-flops comprises one flip-flop connected to said shorting inverter and at least two flip-flops connected to said decoder.

15. The system of claim 12, wherein outputs of said decoder are connected to gates of said one or more voltage sense field-effect transistors.

16. The system of claim 12, wherein said shorting inverter comprises a pair of connected field-effect transistors.

17. A method of creating a physical unclonable function circuit security key, comprising the steps of:
    providing a substrate;
    formulating a grid on the substrate, wherein the grid includes one or more power ports;
    connecting the power grid to a power supply;

inserting one or more stimulus-measure circuits, wherein each of the one or more stimulus-measure circuits includes a shorting inverter, at least one voltage sense transistor, and at least one flip-flop; and deriving the physical unclonable function circuit security key based on a measured stimulus and response between nodes of the grid and the one or more stimulus-measure circuits.

18. The method of claim 17, wherein the security key of said deriving step is a voltage drop security key.

19. The method of claim 17, wherein the security key of said deriving step is an equivalent resistance security key.

20. The method of claim 17, wherein the grid is a power grid.

21. The method of claim 17, wherein the grid is a ground grid.

* * * * *

UNITED STATES PATENT AND TRADEMARK OFFICE
CERTIFICATE OF CORRECTION

PATENT NO. : 8,610,454 B2  
APPLICATION NO. : 13/513941  
DATED : December 17, 2013  
INVENTOR(S) : James Plusquellic, Dhruva J. Acharyya and Ryan L. Helinski Page 1 of 1

It is certified that error appears in the above-identified patent and that said Letters Patent is hereby corrected as shown below:

In the Specification

Column 4, line 33, replace 'FIG. 4' with 'FIG. 4B'.

Column 4, line 35, add 'FIG. 4B is a schematic diagram of another embodiment of a SMC according to the present invention;'.

Column 5, line 47, replace 'FIGS. 3(a) and 3(b)' with 'FIG. 3'.

Column 5, line 48, replace 'FIGS. 3(a)' with 'FIG. 3'.

Column 5, line 54, replace 'FIG. 3(b)' with 'FIG. 3'.

Column 6, line 59, replace 'FIG. 3(b)' with 'FIG. 3'.

Column 7, line 11, replace 'FIG. 3(b)' with 'FIG. 3'.

Column 9, line 2, replace 'FIG. 3(a)' with 'FIG. 3'.

Column 10, line 56, replace 'FIG. 3(b)' with 'FIG. 3'.

Signed and Sealed this  
Eighth Day of April, 2014

Michelle K. Lee  
*Deputy Director of the United States Patent and Trademark Office*